United States Patent
Martin

[11] Patent Number: 5,806,235
[45] Date of Patent: Sep. 15, 1998

[54] APPARATUS FOR STORING, TYING AND DISPENSING FISH HOOKS

[76] Inventor: Dennis R. Martin, 105 Glenside Ave., Wilmington, Del. 19803

[21] Appl. No.: 758,884

[22] Filed: Dec. 2, 1996

[51] Int. Cl.⁶ ................................................ A01K 97/06
[52] U.S. Cl. .............................................................. 43/57.1
[58] Field of Search ........................... 43/4, 57.1; 221/75

[56] References Cited

U.S. PATENT DOCUMENTS

| | | | |
|---|---|---|---|
| 2,081,817 | 5/1937 | Johnson . | |
| 2,520,481 | 8/1950 | Tuerff | 221/75 |
| 2,525,057 | 10/1950 | Anderson | 43/57.1 |
| 2,682,126 | 6/1954 | Shepherd | 43/1 |
| 2,717,470 | 9/1955 | Holdeman | 43/57.5 |
| 2,804,716 | 9/1957 | Adkison | 43/54.5 |
| 2,846,803 | 8/1958 | Rettig | 43/4 |
| 3,141,258 | 7/1964 | Mayer | 43/57.5 |
| 3,278,246 | 10/1966 | Baum | 312/71 |
| 3,402,957 | 9/1968 | Peterson | 289/17 |
| 3,430,379 | 3/1969 | Wolfrum | 43/57.5 |
| 4,333,614 | 6/1982 | Flax | 242/1 |
| 4,414,771 | 11/1983 | Martin | 43/4 |
| 4,437,258 | 3/1984 | Allard | 43/57.5 |
| 4,468,882 | 9/1984 | Marusak | 43/57.1 |
| 4,638,922 | 1/1987 | Stoltz | 221/75 |
| 4,660,314 | 4/1987 | Janssen et al. | 43/4 |
| 4,671,426 | 6/1987 | Grossi | 221/75 |
| 4,759,469 | 7/1988 | Lowrance et al. | 221/75 |
| 4,765,082 | 8/1988 | Nicholas | 43/4 |
| 4,796,372 | 1/1989 | Klein | 43/4 |
| 4,864,762 | 9/1989 | Cox | 43/4 |
| 4,995,531 | 2/1991 | Summers | 221/75 |

*Primary Examiner*—Terry Lee Melius
*Assistant Examiner*—Darren Ark
*Attorney, Agent, or Firm*—Ratner & Prestia

[57] ABSTRACT

An apparatus for containing, threading and dispensing fish hooks, wherein said fish hooks comprise a hook portion and an eye portion. The apparatus comprises an enlongated housing having a length, an axis coextensive with said length, a bore extending along said axis the length of said housing, an open front end lying in a plane substantially perpendicular to the axis, and a back end. A grooved shaft, having a front end and a back end, is rotatably mounted within the bore and extends along said axis. A spiral groove is cut around the perimeter of the grooved shaft, wherein the groove is adapted to contain the hook portions of a plurality of fish hooks. An eye groove extends out from the bore into the housing and extends along the length of the bore in the direction of the axis. The groove is adapted to contain the eye portions of the plurality of fish hooks. Finally, a slotted opening extends through the eye groove and the housing at a position aligned with the end of the spiral groove at the front end of the shaft.

12 Claims, 2 Drawing Sheets

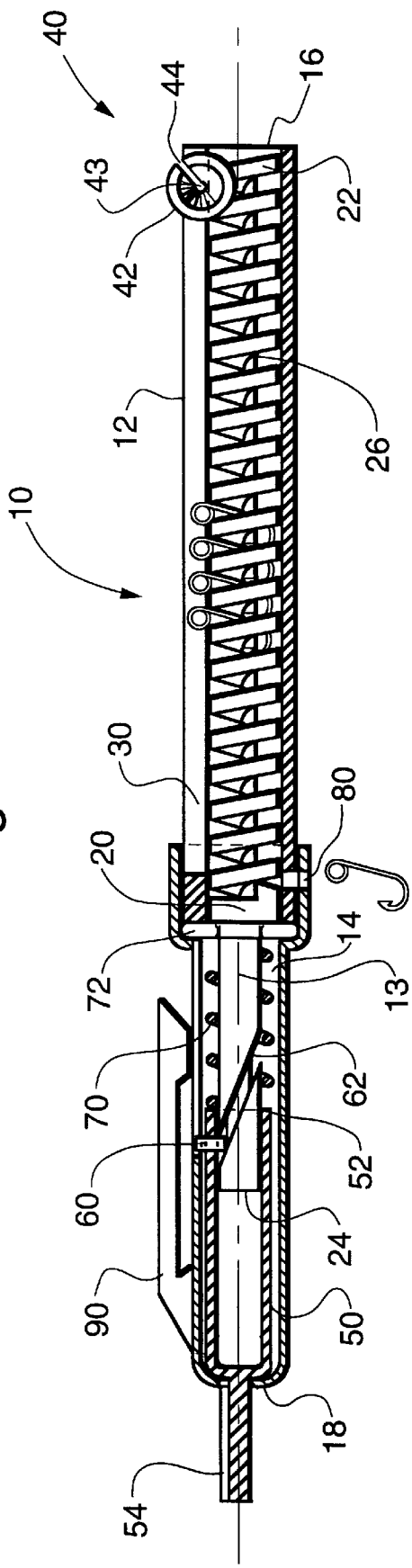
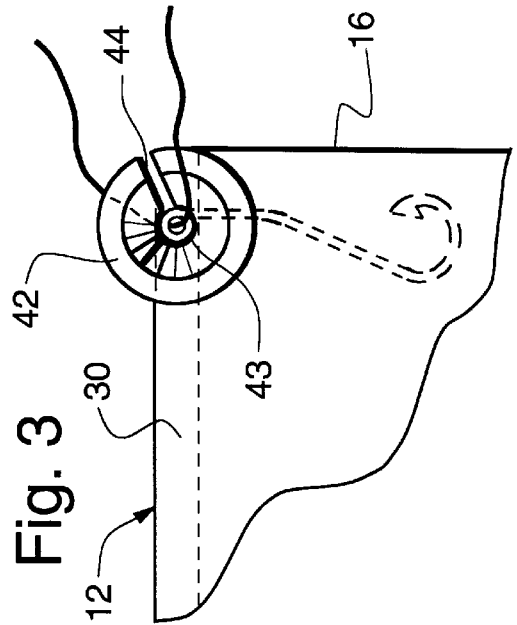
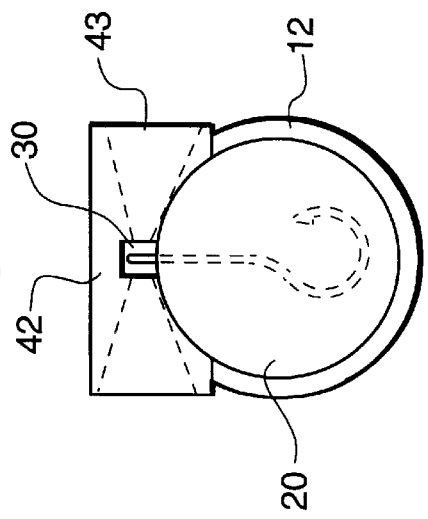

APPARATUS FOR STORING, TYING AND DISPENSING FISH HOOKS

BACKGROUND OF THE INVENTION

1. Field of the Invention

This invention relates generally to an apparatus for storing, tying fish lines through, and subsequently dispensing fish hooks. In particular, this invention relates to a tubular, pen-like fish hook storing and dispensing device with a simple means for advancing each fish hook to a predetermined position for tying a fish line therethrough prior to dispensing.

2. Description of Related Art

Because of the nature, size and use of fish hooks, rigging of a fish hook presents unique problems. Fish hooks, of course, are quite sharp and present a hazard in handling when the sharpened portion is exposed. This is particularly the case when the fish line must be tied to the fish hook under unsteady conditions. It is not unusual for fishermen to suffer substantial frustration, in addition to puncture wounds, while attempting to thread and tie a fish line through the small fish hook eye while in a boat or standing in or adjacent to a stream, often while trying to fight the wind, cold and other elements.

Storing fish hooks also presents unique problems. In particular, when fish hooks are stored together, they often become entangled, which causes frustration and increases the hazard of piercing one's skin during handling.

As a result of these and other related hazards and difficulties presented by the rigging and storing of fish hooks, certain devices have been developed over time in an attempt to alleviate some of these difficulties. For instance, fish hook containing devices have been developed which provide an enclosed portion which is adapted to contain the pointed portion of the hook, while the eye portion remains exposed for threading. Although such devices may have the capability to store multiple fish hooks and reduce the danger of piercing the skin, the difficulty in actually threading and tying the fish line still remains.

Other devices have been developed which provide holders which facilitate threading of a fish line or leader through the eye of a fish hook. Typically, in such devices, a single fish hook is inserted into a holder with the eye of the fish hook adjacent to a converging funnel-like opening which guides the fish line through the eye of the fish hook. However, once the line is threaded through the fish hook eye, typically the hook is removed from the holder to permit conventional manual tying of the knot.

More recently, U.S. Pat. No. 4,414,771, issued to Harley D. Martin, discloses a method and apparatus for storing, dispensing and tying fish hooks. The patent discloses a fish hook storage container having an arcuate channel therethrough which is adapted to receive a fish hook with the eye of the fish hook positioned at the larger radius of the arcuate channel. There is a spring disposed which extends from the center of the dispenser and bears upon the fish hooks, pushing them toward one end of the channel. At that end, an opening is provided adjacent to either side of the final fish hook eye, thus allowing one to thread and tie a line through the fish hook eye prior to dispensing the fish hook from the storage container. However, the act of tying the line on the device is clumsy since the hook portion protrudes from the device and will often stick the user's fingers.

There is accordingly a need for a simple and refillable fish hook storing, tying and dispensing device adapted to contain different sized hooks, which has the ability to easily and consistently move each individual fish hook into the same, predetermined position to allow for the easy and safe tying of a line through the fish hook eye while the hook is contained within the device.

These and other objects of the present invention will be clear from the following description.

SUMMARY OF THE INVENTION

The present invention is an apparatus for containing, threading and dispensing fish hooks, wherein said fish hooks comprise a hook portion and an eye portion, the apparatus comprising:

an elongated housing having a length, an axis coextensive with said length, a bore extending along said axis the length of said housing, an open front end lying in a plane substantially perpendicular to the axis and a back end;

a grooved shaft, having a front end and a back end, rotatably mounted within the bore and extending along said axis;

a spiral groove cut around the perimeter of the grooved shaft, said groove beginning at the front end of the shaft and spiraling around the perimeter of the shaft, terminating before the back end of the shaft, wherein said groove is adapted to contain the hook portions of a plurality of fish hooks;

an eye groove extending out from the bore into the housing and extending along the length of the bore in the direction of the axis, said groove adapted to contain the eye portions of the plurality of fish hooks; and a slotted opening extending through the eye groove and the housing at a position aligned with the end of the spiral groove at the front end of the shaft.

BRIEF DESCRIPTION OF THE DRAWINGS

The invention can be more fully understood from the following description thereof in connection with the accompanying drawings described as follows.

FIG. 1 is a schematic cross-sectional elevation view of one embodiment of the present invention.

FIG. 2 is a schematic front view of one embodiment of the present invention.

FIG. 3 shows the slotted opening of one embodiment of the present invention.

DESCRIPTION OF THE PREFERRED EMBODIMENT(S)

Figures 4A, 4B, 4C:
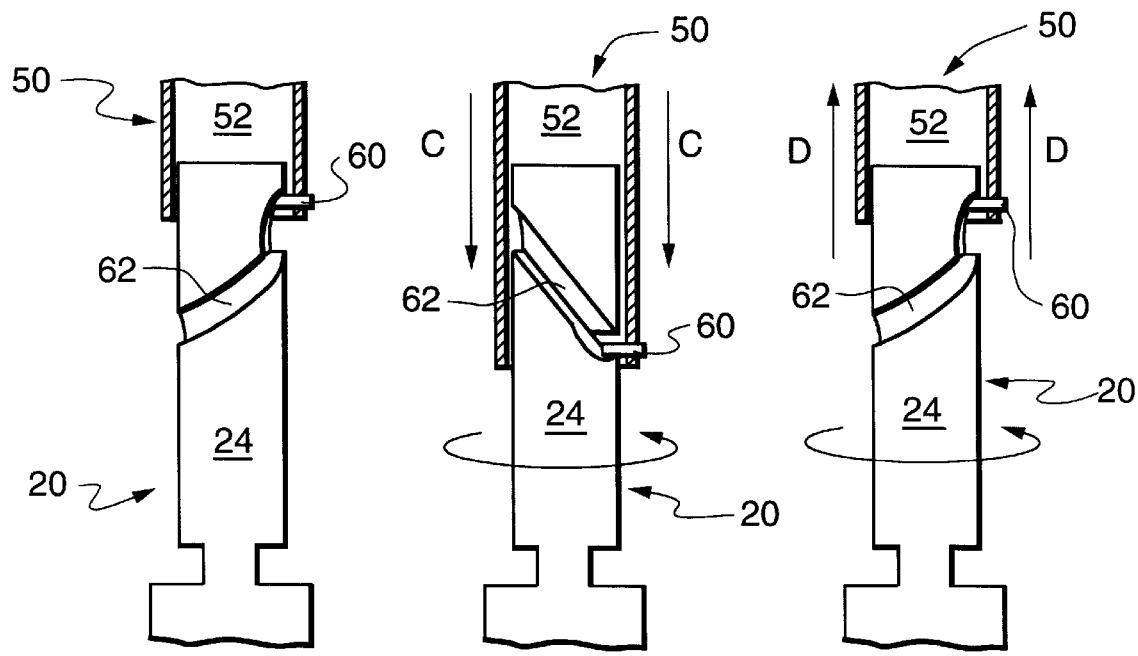
FIG. 4a shows the rotational means of one embodiment of the present invention in the first, biased position.
FIG. 4b shows the rotational means of one embodiment of the present invention in the second, advanced position.
FIG. 4c shows the rotational means of one embodiment of the present invention once it has returned to the first, biased position.

Throughout the following detailed description, similar reference characters refer to similar elements in all figures of the drawings.

The present invention relates to a simple hand-held fish hook storing, tying and dispensing device which looks and functions like a "click" pen whereby the entire motion of feeding each individual fish hook to an appropriate position for tying and subsequent dispensing can be accomplished with one hand, by "clicking" the hooks forward.

Referring now to FIG. 1, there is shown one embodiment of the fish hook apparatus of the invention. The device 10 includes an elongated housing 12 having a longitudinal axis 13 and a bore 14 formed along the axis 13. The housing also has a front end 16 and a back end 18. Front end 16 is preferably open and lies in a plane substantially perpendicular to axis 13.

Rotatably disposed in the direction of axis 13 and through bore 14 of housing 12 is a shaft 20, having a front end 22 and a back end 24. Preferably, the front end 22 of shaft 20 has a spiral groove 26 formed thereon around the perimeter of the shaft 20. Spiral groove 26 is provided to contain the hook portions of the fish hooks and facilitate their movement. Spiral groove 26 begins at the front end 22 of shaft 20 and extends toward the back end 24 of shaft 20, but ends before reaching the back end 24. The length of spiral groove 26 will depend upon how many fish hooks one wants to store within the apparatus. The longer spiral groove 26 is, the more fish hooks that can be carried thereon. The only essential feature of the groove 26 regarding its length is that it ends prior to reaching the back end 24 of shaft 20, so as not to interfere with the rotational means located at that back end 24 (explained later).

As can best be seen in FIG. 1, spiral groove 26 is angled at a predetermined pitch. As those having ordinary skill in the art are well aware, fish hooks are made in different sizes with different pitches. Thus, the pitch of the spiral groove 26 is preferably angled to correspond with a specific pitch of a fish hook. However, spiral groove 26 can be adapted to simultaneously contain multiple hooks having different pitches. Accordingly, each user of the device can incorporate a shaft 20 having a spiral groove 26 specifically pitched for the type or types of fish hooks that individual is planning to use.

The back end 24 of shaft 20 is preferably attached to a plunger 50 which provides a means for rotating shaft 20. As best seen in FIG. 1, back end 24 begins after the termination of spiral groove 26. Back end 24 preferably has a smaller diameter than front end 22 so that plunger 50 can fit over back end 24 in order to cooperate with back end 24. Plunger 50 and back end 24 cooperate to rotate shaft 20. When shaft 20 is rotated, spiral groove 26 rotates to advance the fish hooks toward the front end 24 of shaft 20 and thus the front end 16 of housing 12. More detail on the rotation of shaft 20 and subsequent advancement of the fish hooks will be given later in this description.

Referring now to FIGS. 1 and 2, eye groove 30 is carved into housing 12 from bore 14 as an extension of bore 14. Eye groove 30 preferably extends into housing 12 only that distance which is approximately equivalent to the diameter of the eye portion of a fish hook or slightly larger. The width of eye groove 30 is also preferably only approximately equivalent to the diameter of the eye of a fish hook. Eye groove 30 preferably extends along the entire length of bore 14 in the direction of axis 13. Eye groove 30 is adapted to hold the eye portion of each fish hook which is held within spiral groove 26 such that all of the fish hooks being held in spiral groove 26 are held in the same orientation as one another with the eye portions contained in eye groove 30. In addition, eye groove 30 pre-aligns each fish hook eye portion for eventual threading of the fish line therethrough as will be discussed later.

Located through eye groove 30 near front end 16 of housing 12 is a slotted opening 40 for threading a fish line through the eye portion of the fish hook while the fish hook remains contained within the housing. A preferred embodiment of the slotted opening 40 is depicted in FIGS. 1–3. In this embodiment, the slotted opening 40 comprises a cylindrical portion 42 having a hole 43 running longitudinally through it and a slot 44 extending along hole 43 and out of the cylindrical portion 42. Hole 43 and slot 44 are preferably formed in a direction perpendicular to eye groove 30. In addition, it is essential that hole 43 be formed through eye groove 30 so that the eye portion of the hook can be aligned with hole 43, allowing a fish line to be threaded through both the eye portion of the hook and hole 43. Hole 43 is preferably funnel shaped, as best seen in FIG. 2, with the funnel converging in from the outer sides of the cylindrical portion 42 toward eye groove 30. Such a funnel shape assists in feeding the fishing line through hole 43 and, accordingly, through the eye portion of the fish hook.

One aspect of the invention is that it provides the capability to thread the fish hook while it is contained within the housing. As such, a means for allowing the hook and the threaded fish line to be released from the housing simultaneously must be provided. Slot 44 does just that. Slot 44 must extend away from hole 43 in any direction so long as it extends out of housing 12 in such a way that the fish line and the fish hook can be dispensed from the housing 12 while tied together (see FIGS. 1 and 3).

Although a cylindrical portion 42 is used in the preferred embodiment, other embodiments of the slotted opening 40 are contemplated, such as a simple hole formed directly through eye groove 30 with a slot extending away from the hole and out of the housing 12.

As briefly mentioned earlier, the rotation of shaft 20 rotates spiral groove 26 thus effectuating the movement of the fish hooks toward the front end 22 of shaft 20. This movement brings each fish hook, one at a time, to the front end 16 of housing 12, where the fish hooks are each individually tied and subsequently dispensed. Eye groove 30 assists in keeping the fish hooks aligned for movement in an orderly fashion by not allowing the fish hooks to rotate with the shaft 20. As such, the fish hooks move forward as the spiral groove rotates. The rotation of shaft 20 can be accomplished by any means available. For example, the shaft can merely be rotated by hand.

In a preferred embodiment, attached to the back end 24 of shaft 20 is a plunger 50 for facilitating the rotation of shaft 20. Plunger 50 is cooperatively attached to the back end 24 of shaft 20 in such a way that when plunger 50 is pushed toward the front end of housing 12, shaft 20 rotates around its axis for a predetermined distance, but does not move axially. Shaft 20 remains fixed axially within bore 14 when it is rotated.

In a preferred embodiment, the rotation of shaft 20 is accomplished by a cam and cam riding groove type construction. In this embodiment, the front end 52 of plunger 50 is hollow and is adapted to fit over the back end 24 of shaft 20 as shown in FIG. 1. The back end 54 of plunger 50 is preferably solid for greater stability, although it can be hollow to save on manufacturing costs. Back end 54 and plunger 50 are cooperatively associated such that plunger 50 and back end 54 remain rotationally fixed while being pushed toward the front end of housing 12.

Referring now specifically to FIGS. 4a–4c and 5a–5c, there is pictured a cam 60 and a cam riding groove 62 associated with the back end 24 of shaft 20 and the front end 52 of plunger 50. Cam riding groove 62 is preferably carved into the back end 24 of shaft 20 as pictured in FIGS. 4 and 5. Cam 60 is preferably attached to the front end 52 of plunger 50. Cam 60 should fit slidably within cam riding groove 62.

In a preferred embodiment, a spring 70 is disposed between front end 22 of shaft 20 and front end 52 of plunger 50. The spring 70 surrounds back end 24 of shaft 20. A retaining ring 72 is placed between spring 70 and the front end 22 of shaft 20 in such a way that retaining ring 72 does not touch shaft 20. However, spring 70 rests directly against retaining ring 72. Retaining ring 72 thus separates spring 70 from front end 22, allowing shaft 20 to have free rotational movement about its axis without being hindered by direct pressure from spring 70. Other biasing means can be used in place of the spring, so long as they do not interfere with proper rotation of the shaft.

FIGS. 4 and 5 depict the alternate rotational means of the invention. The rotational means basically entails one complete rotation of shaft 20. One complete rotation is preferably a 360-degree rotation of shaft 20. In order for shaft 20 to perform one complete rotation, plunger 50 and cam 60 will move from a first, biased position to a second, advanced position, and terminate at the final, biased position, which is actually the same as the first position. The complete rotation is adapted to cause each fish hook to move one position forward, due to the angle of cam riding groove 62 explained momentarily.

In addition, of particular importance are the loading and threading grooves provided for the fish hooks. The loading groove is located at approximately the first groove of spiral groove 26 nearest the back end 24 of shaft 20. The threading groove is located at approximately the last groove of spiral groove 26 nearest the front open end 16 of housing 12. The loading groove is where each fish hook is loaded onto the spiral groove 26, and the threading groove is where each fish hook is in position for threading, tying and subsequent disposing from the housing.

Figures 5A, 5B, 5C:
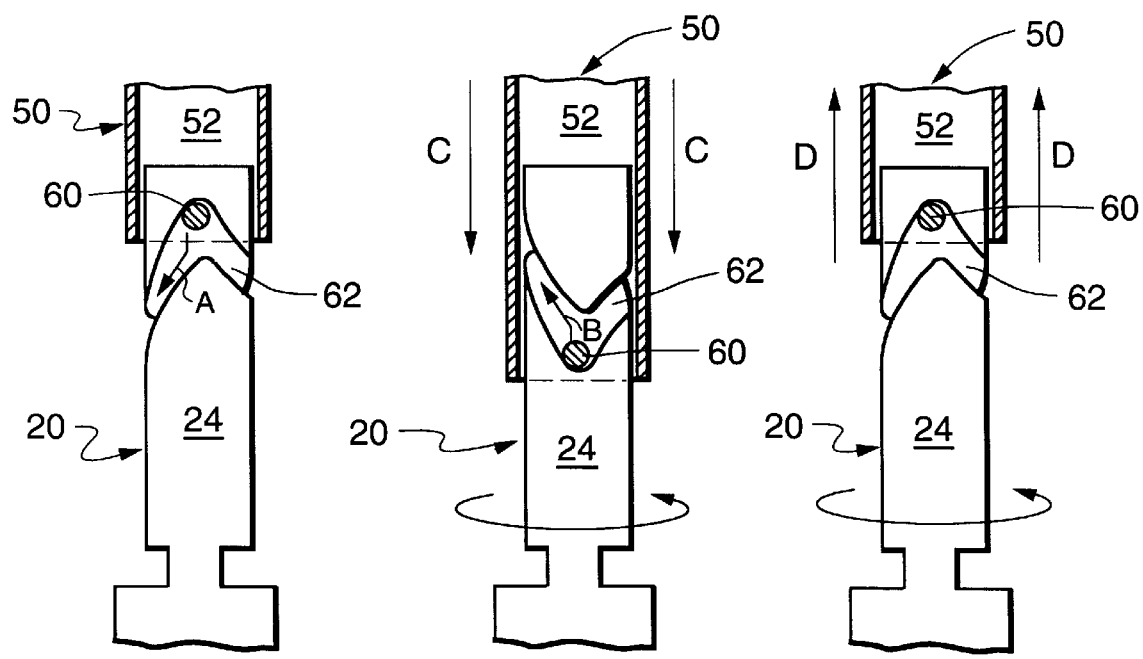
FIG. 5a shows the rotational means of an alternate embodiment of the present invention in the first, biased position.
FIG. 5b shows the rotational means of an alternate embodiment of the present invention in the second, advanced position.
FIG. 5c shows the rotational means of an alternate embodiment of the present invention once it has returned to the first, biased position.

FIGS. 4a and 5a show the first, starting or loading position wherein spring 70 is completely biased and plunger 50 is back as far as it can go from front end 16 of housing 12. In this starting position, cam 60 rests at the back-most position within cam riding groove 62. In this embodiment, cam 60 actually holds plunger 50 in place within the housing 12. Without cam 60, the biasing action of spring 70 would push plunger 50 off end 24 of shaft 20. Other embodiments are contemplated wherein cam 60 is not the only means for holding plunger 50 onto the housing. One example would be a slot formed within the housing in which rides a retaining pin (not shown) attached to the plunger 50.

FIGS. 4b and 5b show the plunger 50 and cam 60 in the second, advanced position. At this position, the shaft 20 is rotated approximately one-half of the complete rotation it will eventually make. This position is reached when plunger 50 is pushed as far as it can go in the direction of arrows "C" shown in FIGS. 4b and 5b. As can be seen in these figures, this position is reached when cam 60 is pushed to the front-most position of cam riding groove 62.

For achieving proper rotation, cam riding groove 62 is preferably carved in an offset manner so that when plunger 50 is moved in the direction of arrows "C" towards the front end 16 of housing 12, cam 60 is forced to contact the opposite wall of cam riding groove 62 at the downward inclined portion as shown by arrow "A" in FIG. 5a. As such, cam 60 is forced to follow the same path within cam riding groove 62 each time plunger 50 is pushed in the direction of arrows "C", forcing shaft 20 to rotate in the same direction each time.

Once plunger 50 has been pushed as far as it will go, the complete rotation of the shaft 20 is achieved by merely taking pressure off plunger 50 and allowing it to return back to the biased starting position (see FIGS. 4c and 5c). The return of plunger 50 to the starting position forces shaft 20 to rotate the final portion of one complete rotation. It is essential that the path of cam riding groove 62 be slightly offset such that cam 60 is forced to move along cam riding groove 62 away from the path that it just arrived on. This will force shaft 20 to finish the complete rotation by continuing to rotate in the same direction. If the path is not offset, cam 60 will merely return to the starting position via the same path it just arrived on. As a result, shaft 20 will have merely rotated halfway and then rotated back along the same path to the starting position without having rotated shaft 20.

Once again referring to FIG. 1, there is shown a reloading slot 80. Reloading slot 80 is preferably slightly wider and thicker than the fish hook being loaded, and provides a means for placing the fish hooks onto the loading groove of spiral groove 26 in the proper orientation. As such, re-loading slot 80 is aligned with the end of spiral groove 26 near the back end 24 of shaft 20. Reloading slot 80 also is preferably located on the opposite side of the housing from eye groove 30. Such an orientation allows one to drop the fish hook into the re-loading slot with the eye portion going in first. Accordingly, as the fish hook is dropped in, eye portion first, the hook portion will fall directly into the loading groove aligned with the reloading slot 80 while the eye portion will move into place in the eye groove 30.

In the embodiment shown in FIG. 1, there is also provided a clip 90 attached to the outside of the housing. The clip 90 is provided to make the device 10 more convenient to carry around. In particular, the clip 90 allows one to carry the device 10 like a pen by clipping it onto, for example, one's shirt pocket.

In operation, the empty apparatus of the invention is prepared for loading of fish hooks. The apparatus should be in the starting, biased position such that the cam 60 and plunger 50 are in the rear-most position of the cam riding groove 62 due to the action of the spring 70. At this point, a fish hook can be loaded into the apparatus. The apparatus is turned upside down such that the open reloading slot 80 is facing up. The first fish hook is loaded by dropping the fish hook into reloading slot 80 with the eye portion of the fish hook entering reloading slot 80 first. As the fish hook drops into the housing, the eye portion will slip past the loading groove aligned just below reloading slot 80. As the eye portion drops into its position in the eye groove 30, the hook portion drops right into position around approximately the loading groove of spiral groove 26.

At this point, the first fish hook has been loaded. In order to load the next fish hook, the first fish hook must be advanced to the next groove, toward the front end of spiral groove 26 in order to make room for the next fish hook. The first fish hook is moved forward in the following manner. The back end 54 of the plunger is pushed forward, toward the front end 16 of the housing. As the plunger is moving toward the front end of the housing, shaft 20 begins to rotate. As the shaft 20 rotates, the first fish hook will begin to move toward the front end 22 of shaft 20 due to the spiraling action of the spiral groove 26.

The plunger 50 is pushed forward as far as it will go, and is then released. Upon release, the spring will force the plunger to move back to the biased, starting position. Due to cooperation of the offset angles of the cam riding groove 62 and the pitch of groove 62, once the plunger has returned to the starting, biased position, the shaft 20 has made one complete rotation. As such, the loading groove held by the first fish hook on the spiral groove has now been vacated as the first fish hook has moved forward to the next groove. At this point, the next fish hook can be loaded as described above.

This process is continued until the first fish hook reaches the threading groove. The threading groove is preferably located approximately at the last groove of the spiral groove 26 nearest the open front end 16 of the housing. When the first fish hook is in the threading groove, the eye portion of that fish hook is aligned with slotted opening 40. Now the apparatus is loaded and the fish hooks are ready for threading and subsequent dispensing. The device can be taken to the fishing site while loaded. In fact, the fish hooks can be contained in this manner in the device for as long as desired.

As just described, the eye portion of the first fish hook will be sitting directly in the slotted opening. When the time comes to thread the fish hook, a fishing line is run through one side of the slotted opening, through the eye portion, and out the other side of the slotted opening. The fishing line is then tied onto the eye portion. Any nature of knot may be tied at this point. However, the easiest way to tie the knot is for the user to grasp device 10 and twist it to form several twists in the fish line. As such, a "fisherman's knot" can be readily completed by pulling on the fish line.

Once tied, the fish hook is ready for dispensing. As such, the plunger is again pushed down and released, causing the shaft 20 to rotate one complete rotation. The tied first fish hook is dispensed and the second fish hook is moved into the threading groove, ready to be threaded. The fishing line which was tied to the first fish hook slides through the slot 42 of the slotted opening when the fish hook is dispensed. The dispensed fish hook is now tied to the fishing line and ready to be baited. This process is repeated each time a fish hook is to be threaded.

Those skilled in the art having the benefit of the teachings of the present invention as herein above set forth, can effect numerous modifications thereto. These modifications are to be construed as being encompassed within the scope of the present invention as set forth in the appended claims.

I claim:

1. An apparatus for containing, threading and dispensing fish hooks, wherein each of said fish hooks comprise a hook portion and an eye portion, the apparatus comprising:

an elongated housing having a length, an axis coextensive with said length, a bore extending along said axis the length of said housing, an open front end lying in a plane substantially perpendicular to the axis and a back end;

a grooved shaft, having a front end and a back end, rotatably mounted within the bore and extending along said axis;

a spiral groove cut around the perimeter of the grooved shaft, said groove beginning at the front end of the shaft and spiraling around the perimeter of the shaft, terminating before the back end of the shaft, wherein said groove is adapted to contain the hook portions of the fish hooks;

an eye groove extending out from the bore into the housing and extending along the length of the bore in the direction of the axis, said groove adapted to contain the eye portions of the fish hooks; and a slotted opening for threading a fishing line through the eye portion of each of the fish hooks while such fish hook remains contained within the housing and aligned with the slotted opening, said slotted opening extending through the eye groove and the housing at a position aligned with the end of the spiral groove at the front end of the shaft.

2. The apparatus of claim 1 further comprising a means for rotating the shaft around its axis for advancing the fish hooks toward the front end of the housing.

3. The apparatus of claim 2 wherein the rotating means comprises a plunger, having a front end and a back end, the plunger cooperatively associated with the back end of the grooved shaft.

4. The apparatus of claim 3 wherein the back end of the grooved shaft comprises a cam riding groove and the front end of the plunger includes a cam extending into and adapted to ride within the cam riding groove.

5. The apparatus of claim 4 wherein a path of the cam riding groove is offset.

6. The apparatus of claim 3 wherein a spring surrounds the back end of the shaft and is disposed between the front end of the plunger and the front end of the shaft, for biasing the plunger away from the front end of the housing.

7. The apparatus of claim 6 further comprising a retaining ring disposed between the spring and the front end of the shaft whereby the spring rests against the retaining ring.

8. The apparatus of claim 1 wherein the spiral groove is angled at a predetermined pitch which corresponds to a pitch of the hook portion of each of the fish hooks.

9. The apparatus of claim 1 wherein the spiral groove is angled at a pitch adapted to correspond to pitches of the hook portions of the fish hooks wherein the pitches of the hook portions of the fish hooks are different.

10. The apparatus of claim 1 further comprising a hook re-loading slot cut into the housing and aligned with a first end of the spiral groove.

11. The apparatus of claim 1 wherein the back end of the housing further comprises a clip.

12. The apparatus of claim 1 wherein the slotted opening further comprises a cylindrical portion having an axis, the cylindrical portion comprising a hole extending along the axis, and a slot extending perpendicularly from the axis away from the hole and through the cylindrical portion to an exterior of the cylindrical portion.

* * * * *